United States Patent
Filatov et al.

(10) Patent No.: US 7,194,387 B1
(45) Date of Patent: Mar. 20, 2007

(54) APPARATUS AND METHOD FOR DETERMINING THE MINIMUM ZONE FOR AN ARRAY OF FEATURES WITH A TRUE POSITION TOLERANCE

(75) Inventors: Anatoly Filatov, Novgorod (RU); Robert J. Guderian, Gilbert, AZ (US); Eugene Tuv, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/239,764

(22) Filed: Sep. 30, 2005

(51) Int. Cl.
*G06F 15/00* (2006.01)
*G06F 17/50* (2006.01)

(52) U.S. Cl. .............................. 702/189; 703/1; 703/7; 700/182; 700/193

(58) Field of Classification Search ................ 702/189; 703/1, 7; 700/182, 193
See application file for complete search history.

(56) References Cited

U.S. PATENT DOCUMENTS 6,507,806 B1 * 1/2003 Tandler ...................... 703/1

* cited by examiner

*Primary Examiner*—John Barlow
*Assistant Examiner*—Sujoy Kundu
(74) *Attorney, Agent, or Firm*—Blakely, Sokoloff, Taylor & Zafman LLP (57) ABSTRACT

A method and apparatus for determining the minimum zone for an array of features with a true position tolerance. In one embodiment, a target function is defined according to a deviation value of each of at least two features from an array of features having a maximum deviation between an actual position and a nominal position. Once defined, the target function is minimized to determine a rotation parameter, a horizontal translation parameter and a vertical translation parameter that provide a minimum target function value as a minimum of the maximum deviation for the array of features. In one embodiment, an inspection report may be generated for the array of features, including at least the minimum, maximum deviation value, as well as the rotation parameter, the horizontal translation parameter and the vertical translation parameter that provide the minimum target function value. Other embodiments are described and claimed.

19 Claims, 9 Drawing Sheets

Linear Fit
Y = 4.287035 + 2.580287 X

APPARATUS AND METHOD FOR DETERMINING THE MINIMUM ZONE FOR AN ARRAY OF FEATURES WITH A TRUE POSITION TOLERANCE

FIELD

One or more embodiments relate generally to the field of inspection of parts to assess conformance to a specified tolerance, with an application to integrated circuit and computer system design (but the technique is in general applicable to all fields that have to inspect for positional tolerances). More particularly, one or more of the embodiments relate to a method and apparatus for determining the minimum zone for an array of features with a true position tolerance.

BACKGROUND

Coordinate measuring machines (CMMs) are generally used to inspect an array of features of a part to determine whether each of the features of the part comply with a maximum tolerance for the part; for example, a CMM may be used to inspect an array of pins on a substrate. Generally, the CMM is used to determine the actual positions of the array of pins relative to a set of datum that constrain all six degrees of freedom from motion. In the case of a two-part or composite position tolerance where the lower segment leaves one or more of the degrees of freedom to best benefit the pattern of an array of features, such as an array of pins or pin field, there is an opportunity to select a fitting algorithm, referred to herein as "soft gauging," that produces results appropriate for the actual requirements of the part.

While soft gauging may include least squares fit and minimum zone algorithms to determine the location of a single prismatic feature (e.g., plain, cylinder, line), there are no minimum zone algorithms readily available for patterns of features, such as an array of pins. According to the American Society of Mechanical Engineers (ASME) Specification Y14.5M-1994 ("Y14.5"), when position tolerance is applied to a pattern of features, all features within the pattern (even the worst feature) must meet that tolerance for the part to be accepted.

Traditionally, compliance of some part to meet a minimum tolerance, such as, for example, an array of features representing, for example, an array of pins on a substrate, is performed using a hard functional gauge. In the past, hard functional gauge could be generated to see whether the given pins on the part could be fit to a corresponding socket. As a result, when using a hard functional gauge for the purpose of evaluating a part for some required positional tolerance, the operator is free to do any manual repositioning, bumping, rotating or moving of the part to determine whether the part may fit into a corresponding socket.

Although Y14.5 only states the definition of the tolerance zone, it does not address what method should be used to demonstrate compliance to the drawing. Readers of an inspection report might want to know how good the part is, not simply whether it passed or failed. When the success criterion is the size of the tolerance zone that is required to contain the worst case point, a minimum zone algorithm will distinguish between a passing part and one that will fail, and additionally provide quantitative information regarding the actual worst case position. When using soft gauging, the algorithms employed are not able to do the same repositioning traditionally performed using hard functional gauges. Failure to do so results in over-rejection of parts that may actually pass, had they been positioned with sufficient accuracy to meet the specification.

Hence, current methods employed in the industry, use a simple translation based on average X, and Y offsets, or use Least Squares algorithms on all, or a portion, of the features in the array to determine a frame of reference. A Least Squares algorithm, seeks to minimize the sum (or average) of the squares of the deviations. This has the effect of favoring the majority of the pins and allowing those that are outliers within the set to have large deviations. Neither of these are optimal solutions, and none of these meet the intent of the ASME Y14.5M-1994 specification for evaluation of true position. Using current algorithms will result in over-rejection of parts, and an inaccurate estimation of process capability for true position.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for determining the minimum zone for an array of features with a true position tolerance are described. In one embodiment, a target function is defined according to a deviation value of each of at least two features from an array of features having a maximum deviation between an actual position and a nominal position. Once defined, the target function is minimized to determine a rotation parameter, a horizontal translation parameter and a vertical translation parameter that provide a minimum target function value as a minimum of the maximum deviation for the array of features. In one embodiment, an inspection report may be generated for the array of features, including at least the minimum, maximum deviation value, as well as the rotation parameter, the horizontal translation parameter and the vertical translation parameter that provide the minimum target function value.

System

Figure 1:
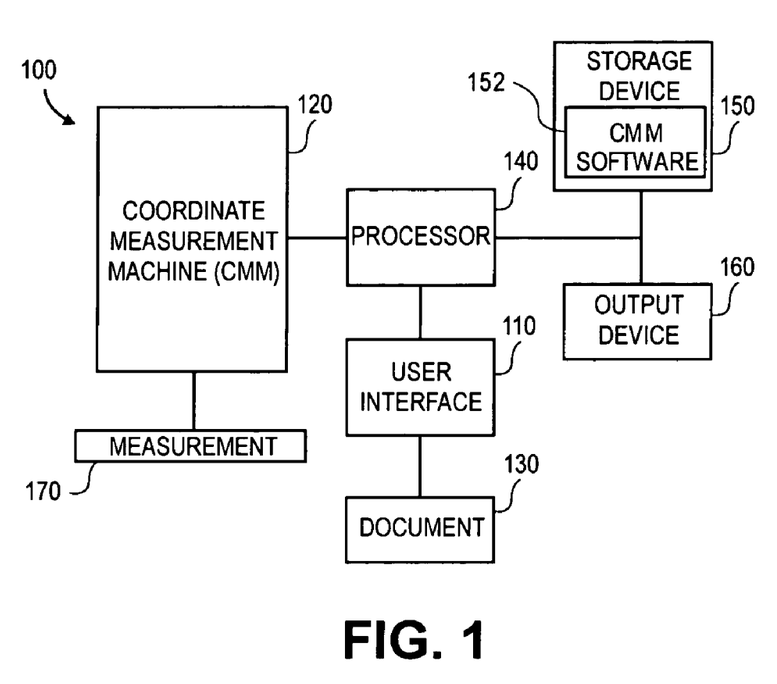
FIG. 1 is a block diagram illustrating a system for determining the minimum zone for an array of features with a true position tolerance, in accordance with one embodiment.

FIG. 1 is a block diagram of a system 100 for determining the minimum zone for an array of features with a true position tolerance according to one embodiment. Representatively, system 100 enables a user to take measurements of a target 170 using a coordinate measurement machine (CMM) 120. Target 170 is a part or other object that is tested to determine whether it conforms to geometric dimensioning and tolerancing (GD&T) requirements that were defined at design-time. Document 130 may contain GD&T data (specifications) of one or more features of target 170 and CMM 120 measures these features on target 170.

In one embodiment, CMM software 152 implements a minimum zone algorithm that provides a powerful combination of a specially designed target function that may use a pattern search routine to create a computationally efficient algorithm that will solve an existing problem in the industry. There is a significant lack of information regarding inspection methods, data interpretation, and algorithms with respect to the American Society of Mechanical Engineers (ASME) Specification Y14.5M-1994 ("Y14.5"). This problem has been considered by vendors of inspection hardware, but no solution has yet been implemented. Because of the non-linear optimization algorithm selected, in one embodiment, the optimized minimum zone algorithm may lends itself to high-volume inspection, in that the additional computation time per part inspected is expected to be <10 milliseconds (ms), on the test data set of 476 pin packages, averaging about 7.7 ms.

In one embodiment, document 130 may also be representative of GD&T data that is communicated to the user orally or embedded into a digital definition of the target, e.g., in a CAD/CAM database. System 100 may include a processor 140 in operative communication with the CMM 120 providing a user interface 110 to receive a feature measurement and corresponding GD&T data, and to determine whether the measured feature is acceptable based on the GD&T data.

In one embodiment, CMM 120 may be used to inspect an array of features. As described herein, an "array of features" may refer to an array of pins or other like components that require compliance to some geometric dimensioning and tolerance, or GD&T. For example, the array of pins may have a corresponding array of mating holes (sockets) to which the array of pins are required to mate to provide an electrical or physical connection. In one embodiment, the positions of the mating holes may define a true (nominal) position for the array of pins. As described herein "true position" may refer to the theoretically exact location of a feature established by basic dimensions.

As described herein, "true position tolerance" defines a zone (tolerance zone) within which the axis or center plane of a feature is permitted to vary from true (theoretically exact) position. In one embodiment, a minimum zone algorithm minimizes a size of the tolerance zone that is required to contain the worst case point for an array of features, regardless of the type of positional tolerance. As described herein, types of position tolerance may include, but are not limited to, Regardless of Feature Size (RFS), Maximum Material Condition (MMC), and Least Material Condition (LMC) with appropriate and simple modifications to the dimensions of the features being measured, and the addition or subtraction of any "bonus tolerance" that may result from the above GD&T specification modifiers from the measured positions or deviation in the resultant target function.

Accordingly, in one embodiment, target 170 may be an array of features, such as, for example, an array of pins on a substrate having a corresponding array of mating holes (sockets). In one embodiment, CMM 120 may generate data regarding the actual location of an array of features relative to a set of datum features that constrain all six degrees of freedom from motion for the array of features. As described herein, data regarding the actual location of the array of features relative to the set of data is referred to herein as actual position data.

In one embodiment, CMM software 152 may transform the actual position data for use with a two part or composite position tolerance, where the lower segment (e.g., a socket) leaves one or more degrees of freedom to best benefit the array of features. If one or more of the degrees of freedom are not constrained, the frame of reference may be adjusted as required by the actual condition of the features. In one embodiment, a minimum zone algorithm, as implemented by CMM software 152, is described that perform reference frame adjustment to produce results appropriate for the actual requirements of the part.

Referring again to FIG. 1, user interface 110 may include a monitor, touchscreen, keyboard, mouse and/or the like. Also, the user interface 110 may include a suitable format for allowing the user to follow prompts, select icons, enter data and review the results. In one embodiment, the user interface 110 may include a user interface showing a feature control frame (not shown) for accessing dialog boxes to aid the user in selecting icons, entering GD&T data and reviewing the results.

Processor 140 may be implemented using a general-purpose computer executing a computer program for carrying out the methods described herein. Alternatively, processor 140 may comprise a digital signal processor or microprocessor embedded in a special purpose system 100. Processor 140 may be in operative communication with storage device 150 for storing data, and to output device 160 for displaying, printing, and/or transmitting data.

In one embodiment, a storage device 150, including CMM software 152, may be a mass storage device located locally or accessed via a network. Alternatively or additionally, storage device 150 may comprise random state/dynamic access memory, or other machine readable media, such as FLASH RAM or optical memory. Processor 140 executes software applications that may be implemented through computer programs. The computer programs and related data may be stored on the processor 140 and/or may be stored on the storage device 150.

Figure 2:
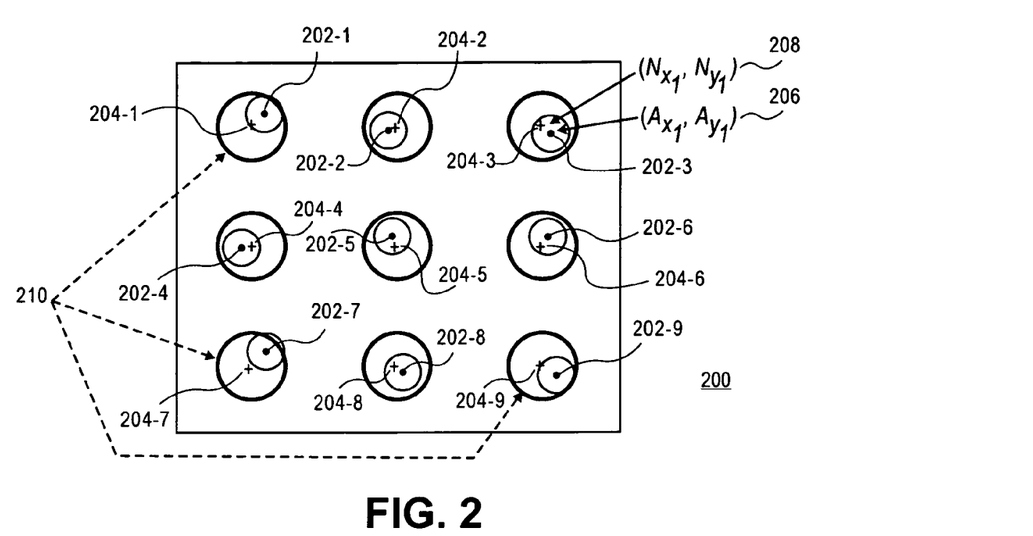
FIG. 2 is a block diagram illustrating a plot of nominal (true) and actual pin positions for a 3×3 array of pins, in accordance with one embodiment.

FIG. 2 is a block diagram illustrating a plot of true (nominal) and actual positions for an array of features, in accordance with one embodiment. Representatively, plot 200 illustrates a 3×3 array of pins, as measured by CMM 120, in accordance with one embodiment. The array of pins 202 (202-1, . . . 202-9) are shown according to an actual position 206 relative to mating holes 204 (204-1, . . . 204-9), which represent a true (nominal) position 208 for the array of pins to provide inspection of such pins for compliance to the mating holes to determine compliance of the pin array to GD&T requirements.

According to the ASME Y14.5 Specification, when a true position tolerance is applied to a pattern of features, all features within that pattern (even the worst feature) must meet that tolerance for the part to be accepted. As indicated by plot 200, shown in FIG. 2, there are three pins 210 that will not fit within their corresponding mating hole 204. Representatively, pins 202-1, 202-7 and 202-9 will not fit within their corresponding mating holes 204-1, 204-7 and 204-9, respectively. According to conventional techniques, such as least squares fit and conventional minimum zone algorithms, the pin array would be rejected as failing to meet GD&T requirements.

However, positions of the mating holes 204 relative to the array of pins 202 may be adjusted as required by the actual condition of the features. For example, a hard gauge would allow manual repositioning to possibly illustrate that the pin array 202 shown in FIG. 2 is in compliance with GD&T requirements. In one embodiment, a minimum zone algorithm is described for transforming the actual position data captured by CMM 120 (FIG. 1) to simulate the manual repositioning of a part or array of features with a true position call-out, to account for the translation and rotation of the part, to minimize the size of the tolerance zone that contains the worst case point.

As described herein, minimization of the feature with the worst position tolerance or maximum deviation between an actual position and a true position, is referred to herein as "determining the minimum zone." In one embodiment, the minimum zone algorithm defines a function that describes a maximum deviation within an array of features and recommends an optimization routine (such as, for example, Hooke and Jeeves, Nelder-Mead or other like optimization routines) to efficiently determine the correct translation and rotation for determining the minimum zone to minimize the maximum deviation of the features in the array. As described herein, the term "minimum zone" may refer to size of the tolerance zone that is required to contain the worst case point for an array of features.

Figure 3:
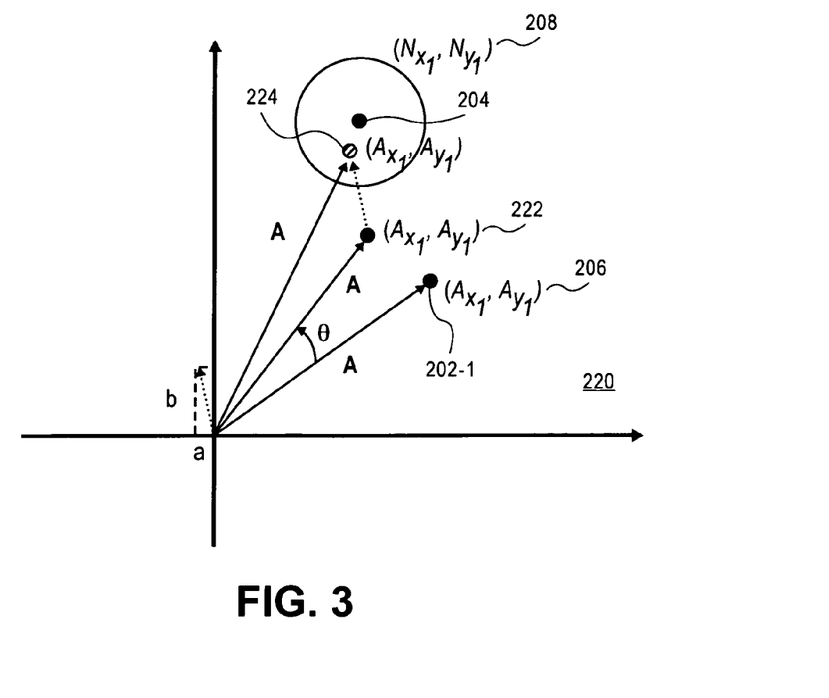
FIG. 3 is a block diagram illustrating the transformation and rotation of actual pin positions to provide compliance with a true position, in accordance with one embodiment.

Referring again to FIG. 2, in one embodiment, implementation of the minimum zone algorithm may begin with the definition of a matrix of vector lengths that represent the deviation of each feature from its true position. In one embodiment, translating the actual position data by a and b in the x-direction and y-direction, respectively, can help improve the fit, as well as rotating the actual position data by an angle theta (θ). By using a non-linear optimization routine with a specialized target function, minimization of a maximum vector lengths can be performed to provide a best fit or minimum zone of the actual position data relative to a true position, FIG. 3 is a graph 220 illustrating the translation of a point and rotation of a point, as required to minimize the deviation of the point, in accordance with one embodiment. In one embodiment, the process of determining a minimum zone for an array of features begins with the defining of a true (nominal point) for each pin location by x and y coordinates $(N_{X1}, N_{Y1})$. All nominal points can then be described by $(N_{Xi}, N_{Yi})$ for i=1 to N, where N is the number of pins on the package. The same is true for the N actual pin location coordinates $(A_{Xi}, A_{Yi})$. In one embodiment, a vector representing an actual pin location, A, needs to be translated and rotated to A". If "$A_X$" is defined to be the vector of the x-coordinates of all pin locations, for 1-N, and $A_y$ to be the vector of the y coordinates of all pin locations from 1-N, according to the actual position data, a 2×N matrix can be defined as:

$$\begin{Bmatrix} A_x \\ A_y \end{Bmatrix} \quad (1)$$

that represents the x- and y-coordinates of all the points in the pin array. The rotation can be described by the relationship of $$A_X = x \cos\theta + y \sin\theta \text{ and } A_Y = -x \sin\theta + y \cos\theta. \quad (2)$$

To rotate all the points by an angle of θ, we need to multiply this matrix by the matrix R, $$\text{where } R = \begin{pmatrix} \cos\theta & \sin\theta \\ -\sin\theta & \cos\theta \end{pmatrix}. \quad (3)$$

To translate the entire array, we add the scalar quantities a to the vector $A_x$, and b to the vector $A_y$. So, in matrix terms, the rotated and translated actual position data (e.g., array of pin positions) can be expressed as $$\overline{A''} = (R)\begin{Bmatrix} A_x \\ A_y \end{Bmatrix} + \begin{Bmatrix} a \\ b \end{Bmatrix}. \quad (4)$$

Graphically, this is shown in FIG. 3.

Representatively, an actual position 206 of pin 202-1 is initially rotated by an angle θ to provide a rotated actual position 222. Next, the rotated actual position 222 is translated in the horizontal direction by a scalar amount a and also translated in the vertical direction by a scalar amount b. According to one embodiment, as shown in FIG. 3, the rotation of the actual location 206 of pin 202-1 by an angle θ and the translation of the actual location of pin 202-1 in both the vertical and horizontal directions, according to scalar quantities a and b, respectively, results in a translated and rotated actual location 224.

As should be recognized by the point rotation and translation as shown in FIG. 3, the initial actual position 206 of pin 202-1 was initially outside of mating hole 204. However, by translating and rotating actual position 206 of pin 202-1, the position of the rotated and translated pin 224 is now within mating hole 204. Representatively, the deviation between nominal position 208 of mating hole 204 and the actual position 206 of pin 202-1 is reduced by rotating and translating the pin position, such that the rotated and translated pin position 224 now falls within nominal position 208 of mating hole 204 and is therefore in compliance with GD&T requirements for the respective part.

In one embodiment, the minimum zone algorithm may define a vector that provides a distance between translated and rotated actual positions respective to their nominal or true position. For example, if $N_x$ is defined to the vector of the x-coordinates of all nominal pin locations from 1 to N, and $N_y$ to be the vector of the y-coordinates of all nominal pin location from 1 to N, a 2×N matrix can be defined as:

$$\begin{bmatrix} N_x \\ N_y \end{bmatrix} \quad (5)$$

This description of this matrix is provided in Equation 6 as the first component of the equation.

In one embodiment, a vector, $\vec{d}$, is defined from the rotation and translation provided by vector $\overline{A}$ (see, Equation 4), which is the difference between nominal position and the actual position, translated and rotated. Symbolically, this can be written as a vector of radial offsets:

$$\vec{d} = \begin{Bmatrix} Nx \\ Ny \end{Bmatrix} - R \begin{Bmatrix} Ax \\ Ay \end{Bmatrix} - \begin{Bmatrix} a \\ b \end{Bmatrix} \quad (6)$$

In one embodiment, Hooke and Jeeves' (HJ) method is used to minimize the following target function:

$$f(a, b, \theta) = \sum_{i \in \Omega(x,y,\theta)} L(d_i(a, b, \theta)) \quad (7)$$

Where (a, b, θ) is vector of translation/rotation parameters, $d_i(a, b, \theta)(i=1 \ldots n)$ are pin Euclidian distances to the nominal positions, $\Omega(a, b, \theta)$ is a set of indices of two most deviated pins which depends on (a, b, θ) and L(d) is a loss function with derivative growing on (0,∞).

Using this target function significantly (>100%) improve the convergence rate compared to direct minmax search. In one embodiment, function $d_i(a, b, \theta)$ grows faster along θ (rotation parameter) than on a and b (translation parameters). In one embodiment, a linear space transformation is used to increase search convergence speed.

Table 1 illustrates description of the target function computation algorithm for each evaluation of the target function by a pattern search or optimization routine, including, but not limited to Hooke and Jeeves, Nelder and Mead, or other like method for finding the minimum of a continuous objective function.

TABLE 1

Target Function Computation Algorithm $Nx_i$ (i = 1 ... n) - nominal pin position x coordinate values
$Ny_i$ (i = 1 ... n) - nominal pin position y coordinate values
$Ax_i$ (i = 1 ... n) - actual pin position x coordinate values
$Ay_i$ (i = 1 ... n) - actual pin position y coordinate values
α = 0.001 - space shrinkage parameter
L(d) - exponentially growing loss function, which may vary (we used $d^{20}$)

$$\overline{A} = (R) \begin{Bmatrix} A_x \\ A_y \end{Bmatrix} + \begin{Bmatrix} a \\ b \end{Bmatrix},$$

minmax - current best estimation of the minmax deviation value
(minmax_x, minmax_y, minmax_θ) - current best point
Input: (x, y, θ) - vector of translation/rotation parameters
Step 1: [shrink space along rotation parameter] θ = θ * α;
Step 2: [compute sine and cosine of rotation parameter]
    cos_θ = cos(θ), sin_θ = sin(θ);

TABLE 1-continued

Target Function Computation Algorithm

Step 3: [find two max deviations]
    max1 = 0, max2 = 0;
    [for each pin]
    for i = 1 ... n do
        [find position]
        x' = $Ax_i$ * cos_θ + $Ay_i$ * sin_θ + x
        y' = –$Ax_i$ * sin_θ + $Ay_i$ * cos_θ + y
        Δx = $Nx_i$ – x'
        Δy = $Ny_i$ – y'
        [Euclidian distance]
        Δ = sqrt (Δx*Δx + Δy*Δy)
        [should be any < max1 < max2]
        if Δ > max2 then max1 = max2, max2 = Δ
        else if Δ > max1 then max1 = Δ
    end for
Step 4: [update the best result and the best point]
    if max2 < minmax then
        minmax = max2;
        minmax_x = x;
        minmax_y = y;
        minmax_θ = θ;
Step 5: [compute the target value] f = L(max1) + L(max2)
Vector (minmax_x, minmax_y, minmax_θ) - is taken as the solution after the computation is finished. So, the solution we take is the best point, met during HJ search.

Table 2 illustrates the Hooke and Jeeves optimization routine, while Table 3 illustrates a pattern search subroutine performed by the optimization method shown in Table 2. In one embodiment, the target function computation algorithm shown in Table 1, the optimization routine shown in Table 2 and the pattern search routine shown in Table 3 may be implemented as CMM software 152, as shown in FIG. 1. Procedural methods for implementing one or more embodiments are now described.

TABLE 2

Hooke and Jeeves Method

Input:
$y^0$-initial point,
ε > 0-accuracy parameter,
h >> ε-pattern search parameter,
α = 2-step increase parameter
Step 1:    $z^1 = y^0$, k = 0
Step 2: $y^{k+1} = PS(z^{k+1})$
Step 3: if $f(y^{k+1}) < f(y^k)$ then k = k + 1 and go to step 4
    else
        if h <_ then stop
        else
            if (k = 0) then h = h/2 and go to step 2
            else $y^0 = y^k$, k = 0 and go to step 2
Step 4: $z^{k+1} = y^k +$ _ *$(y^k - y^{k-1})$ and go to step 2

TABLE 3

Figure 4:
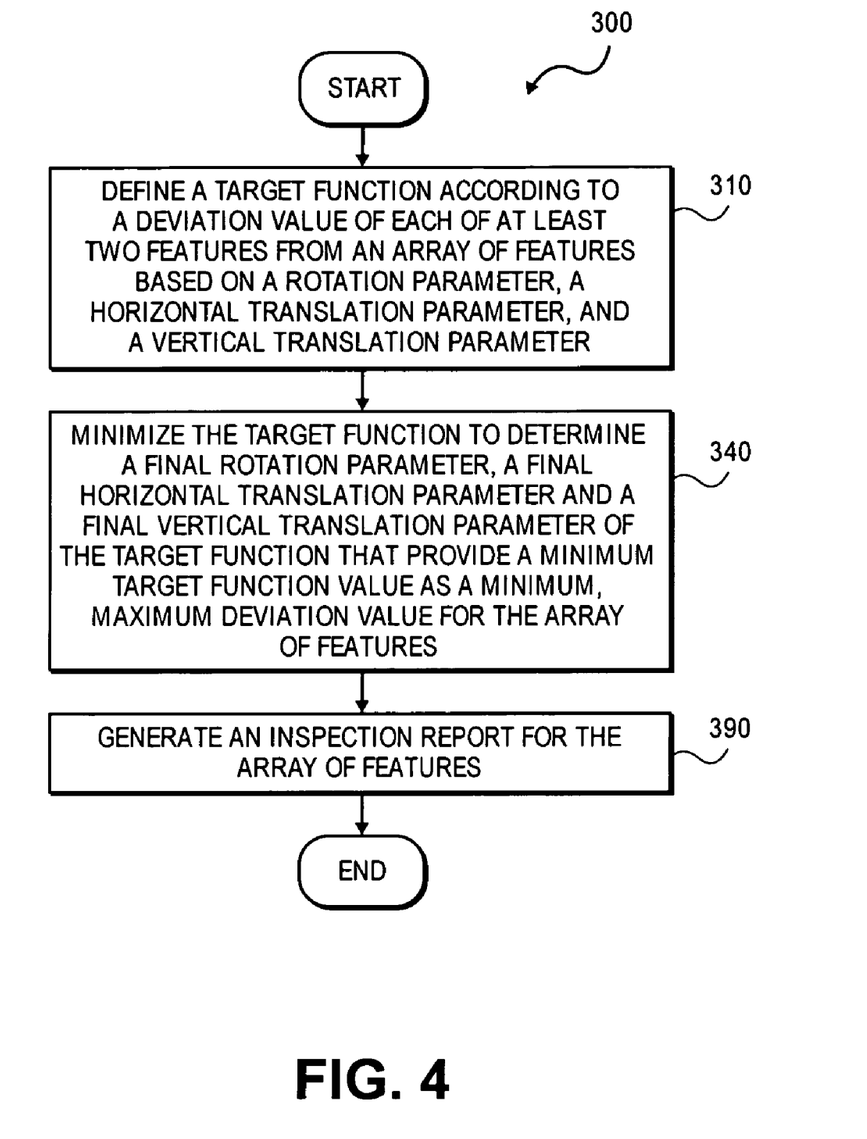
FIG. 4 is a flowchart illustrating a method for determining the minimum zone for an array of features with a true position tolerance, in accordance with one embodiment.

Pattern search subroutine: y' = PS(z)

y' = z
for i = 1. . .n do
    if f(y' + h*$e^i$) < f(y') then y' = y' + h*$e^i$
        else if f(y' – h*$e^i$) < f(y') then y' = y' – h*$e^i$ Operation Turning now to FIG. 4, the particular methods associated with various embodiments are described in terms of computer software and hardware with reference to a flowchart. The methods to be performed by a computing device (e.g., a CMM) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 4 is a flowchart illustrating a method 400 for determining the minimum zone for an array of features with a true position, in accordance with one embodiment. In the embodiments described, examples of the described embodiments will be made with reference to FIGS. 1–3 and 8–12. However, the described embodiments should not be limited to the examples provided to limit the scope provided by the appended claims.

Referring again to FIG. 4, at process block 310, a target function is defined according to a deviation value of each of at least two features form an array of features based on a rotation parameter, a horizontal translation parameter and a vertical translation parameter, for example, as shown as Equation (7). At process block 340, the target function is minimized to determine a final rotation parameter, a final horizontal translation parameter and a final vertical translation parameter of the target function that provide a minimum target function value as a minimum, maximum deviation value for the array of features.

In one embodiment, minimization of the target function is performed using an optimization routine, such as, for example, illustrated in Tables 2 and 3. Once the minimum, maximum deviation value is determined, at process block 390, an inspection report may be generated for the array of features including, for example, the minimum, maximum deviation value, the final vertical translation, horizontal translation and rotation parameters. In one embodiment, the inspection report may be shown to a user via user interface 110 (FIG. 1) or printed via, for example, output device 160 (FIG. 1).

Figure 5:
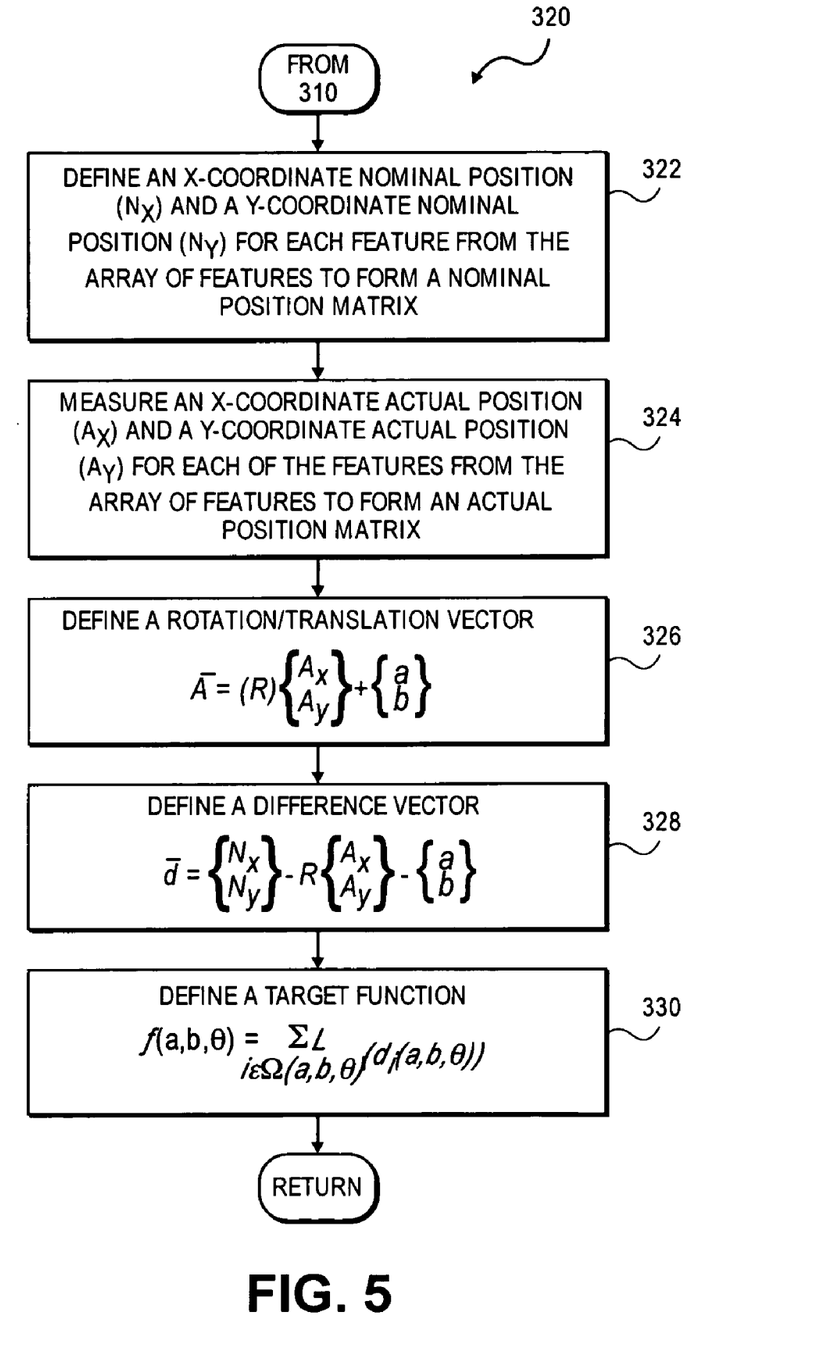
FIG. 5 is a flowchart illustrating a method for defining a target function, in accordance with one embodiment.

FIG. 5 is a flowchart illustrating a method 320 for defining the target function of process block 310 of FIG. 4, in accordance with one embodiment. At process block 322, an x coordinate nominal position and a y coordinate nominal position are defined for each feature from an array of features to form a nominal position matrix. (See, Equation (5).) At process block 324, an x coordinate actual position ($A_x$) and a y coordinate actual position ($A_y$) are measured for each feature from the array of features, as "actual position data" and are used to form an actual position matrix (see, Equation 1). For example, in one embodiment, the actual position data referred to may include, for example, the actual positions 306 of the 3×3 array of pins, as shown in FIG. 2.

At process block 326, a rotation/translation vector is defined from the actual position matrix (see Equation 4). In one embodiment, the rotation/translation vector enables translation of the entire array of points in the x and y directions to improve fit of, for example, an array of pins with corresponding mating holes, such as shown in FIG. 2. Likewise, the rotation/translation vector enables rotating of the entire array of points by an angle theta ($\theta$) to provide a best fit of the measured points to the nominal positions. At process block 328, a difference vector is defined according to Equation (6). In one embodiment, the difference vector enables the computation of a deviation between the nominal position of a pin and a rotated and translated position of the pin from the pin array or array of features. Once the difference vector is defined, at process block 330, the target function is defined according to Equation (7).

In one embodiment, the definition of a target function, for example, according to Equation (7) represents the maximum deviation value of a feature from an array of features according to a received rotation parameter and horizontal and vertical translation parameters. In one embodiment, the minimization of this target function, rather than depending on the deviation of only one item (i.e., the item with maximum deviation), the target function may be based on the deviation of a maximum deviated feature between an actual position and a nominal position and a second most deviated feature between an actual position and a nominal position for the respective feature. As a result, each step of the optimization method, or search method, such as, for example, Hooke and Jeeves, can be considered as fitting the most deviated item by transforming the array of features, for example, as illustrated in FIG. 6.

Figure 6:
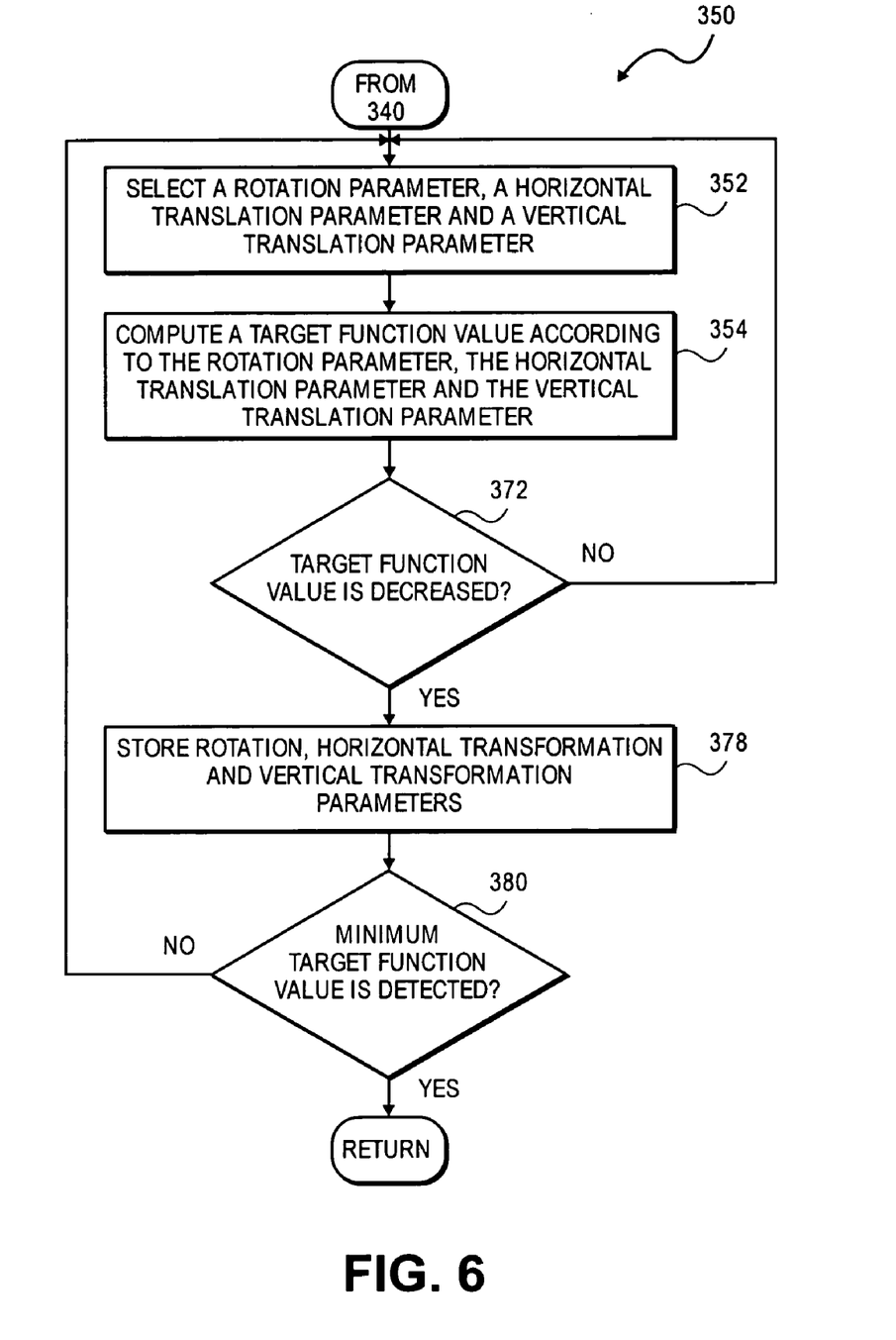
FIG. 6 is a flowchart illustrating a method for minimizing a target function, in accordance with one embodiment.

FIG. 6 is a flowchart illustrating a search method 350, such as shown in Tables 2 and 3, in accordance with one embodiment. At process block 352, a rotation parameter, a horizontal translation parameter and a vertical translation parameter may be selected. In one embodiment, selection of the rotation, horizontal translation and vertical translation parameters may be performed according to a pattern search routine, such as, for example, illustrated with reference to Table 3. Once selected, at process block 354, a target function value is computed according to the rotation parameter, the horizontal translation parameter and the vertical translation parameter.

In one embodiment, at process block 372, it is determined whether, for example, the given rotation, horizontal translation and vertical translation parameters lead to a decrease in the value of the target function. If a decrease is detected, the rotation, horizontal translation and vertical translation parameters are stored at process bock 374. Accordingly, at process block 380, process blocks 352–354 are repeated until a minimum target function value is detected.

Figure 7:
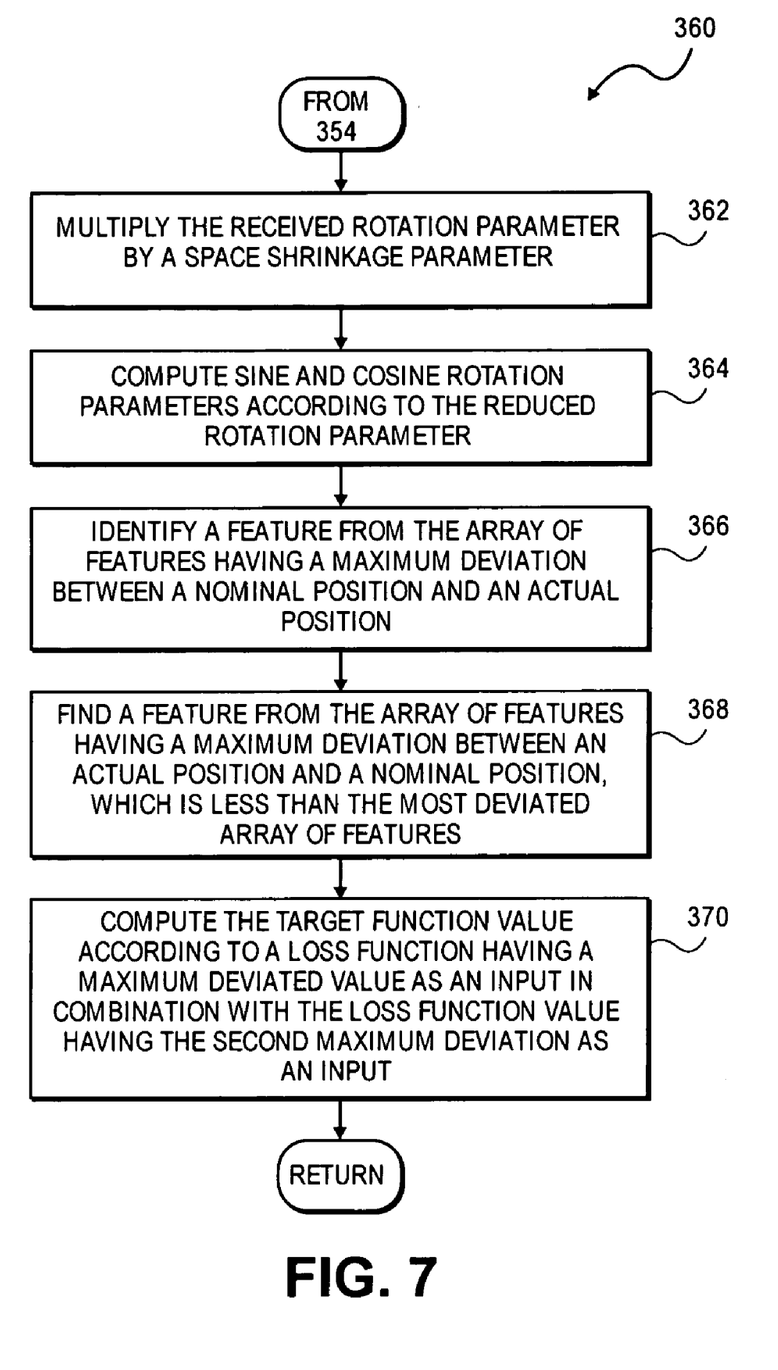
FIG. 7 is a flowchart illustrating a method for evaluating a target function according to a given input, in accordance with one embodiment.

FIG. 7 is a flowchart illustrating a method 360 for computing the target function value of process block 354, in accordance with one embodiment. In one embodiment, method 360 of FIG. 7 is also illustrated with reference to the pseudo code provided in Table 1. Representatively, at process block 362, a received rotation parameter may be multiplied by a space shrinkage parameter, for example, as shown at Step 1 in Table 1. As shown in Table 1, in one embodiment, the shrinkage parameter $\alpha$ may be set to a value of 0.001.

At process block 364, a sine rotation parameter and a cosine rotation parameter are computed according to the reduced rotation parameter, for example, as shown as Step 2 in Table 1. At process block 366, a feature is identified from the array of features having a maximum deviation between a nominal position and an actual position. At process block 368, a feature is identified from the array of features, having a maximum deviation between an actual position and a nominal position, which is less than the deviation of the feature having the maximum deviation, as identified at process block 366.

For example, as shown in Step 3 of Table 1, a Euclidian distance between translated and rotated actual positions are compared to the nominal positions for the given input vector of translation/rotation parameters. As illustrated, if the deviation is greater than either a maximum deviation value (max2) or a second most deviated value (max1), the deviation is saved. As illustrated at Step 4 of Table 1, the current best point vector is comprised of a minmax value, which is the current best estimation of the minmax deviation point. Likewise, the current best point is provided by the vector (minmax_x, minmax_y, minmax_θ). Accordingly, as shown at Step 4 of Table 1, the most deviated value or max2, is compared to the current best estimation of the minmax deviation value if the identified most deviated feature (max2) is less than the current most deviated feature (minmax), max2 is stored along with the received input parameters.

Referring again to FIG. 7, at process block 470, a target function value is computed according to a loss function having a maximum deviated value as an input in combination with the loss function value having the second maximum deviation value as an input. For example, as shown in Step 5 of Table 1, the target value is computed according to the equation F=L(max1)+L(max2).

Referring again to FIG. 6, as well as Tables 2 and 3, the evaluation of the target function (f( )), as shown in Table 1, is repeated as part of the pattern search subroutine, as well as the sequence of exploratory and pattern moves from a base point to identify points, which decrease the value of the target function. Accordingly, once the optimization method is complete, the vector (minmax_x, minmax_y, minmax_θ) is taken as the solution as a final horizontal translation parameter, a final vertical translation parameter, and a final rotation parameter, which provide a minimum target function value, which is referred to herein as a minimum of the maximum deviation value for the array of features.

Although Y14.5 only states the definition of the tolerance zone, it does not address what method should be used to demonstrate compliance to the drawing. Readers of an inspection report want to know how good the part is, not simply whether it passed or failed. When the success criterion is a minimum zone, referred to herein as a size of the tolerance zone that is required to contain the worst case point, a Minimum Zone algorithm, described herein provides transformation of actual position data to distinguish between a passing part and one that will fail. Failure to do so will result in over-rejection of parts that may actually pass, had they been "positioned" with sufficient accuracy to meet the specifications.

In one embodiment, the minimum zone algorithm described herein is computationally efficient and provides a better fit than current Least Squares methods being employed for pin position inspection by using a non-linear optimization routine, resulting in lower reported maximum offsets for an array of features. Since CMM software can only establish a frame of reference that is constrained in all 6 degrees of freedom, in one embodiment, transformation of the acquired raw data (actual position data) may be performed to account for the degrees of freedom left to best benefit the pattern of pins.

For example, the array of feature (e.g., pin field) may be slightly offset to the front and left of where the datum features indicated, and may have a slight rotation to it. Though these deviations may not seem significant, they can be large relative to the positional tolerance required from each of the pins and still be within the field of view of the CMM. Accordingly, the minimum zone algorithm may take into account translation and rotation of the part to minimized the size of the tolerance zone that contains the worst case point.

Figure 8:
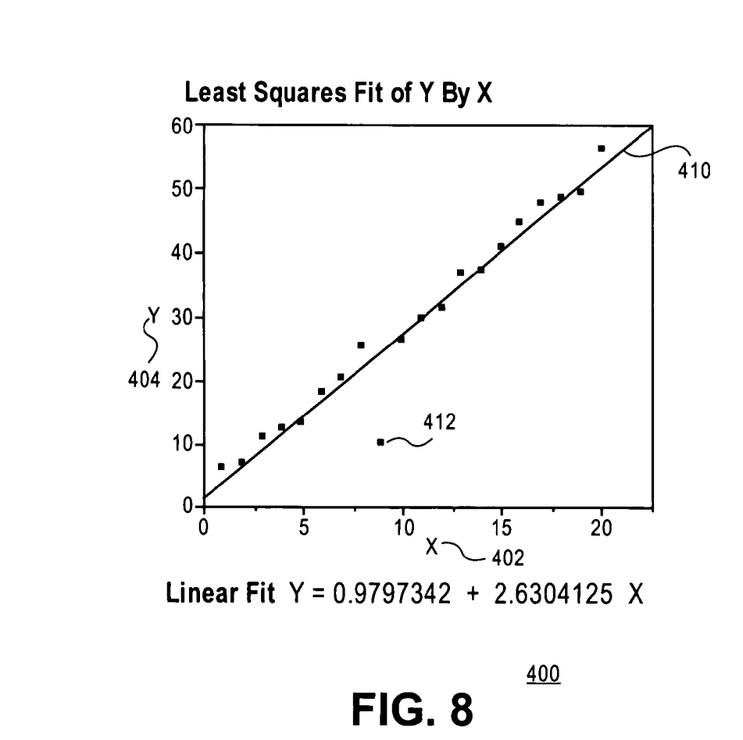
FIG. 8 is a graph illustrating a least square fit approach for determining the minimum zone for an array of features.
Figure 9:
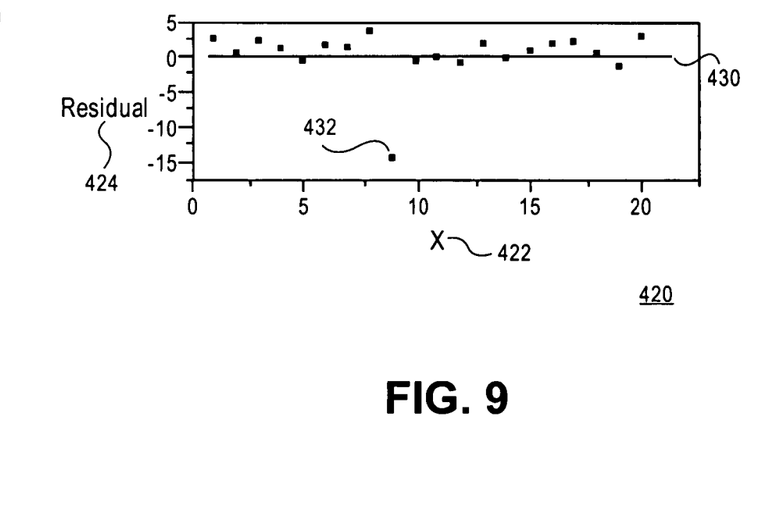
FIG. 9 is a graph illustrating residuals from the least squares fit graph as shown in FIG. 8.

As an analogy to the pin field problem, consider the following graph of a Least Square fit 400 in FIG. 8 as an example. Suppose that we need all points to fall within 10 mm of the fitted line 410 to be functional. The residuals from a Least Squares fit are shown in graph 420 of FIG. 9 indicate that 19 out of 20 points are within 5 mm of the fitted line 430, but that one point 432 is almost 15 mm away.

Figure 10:
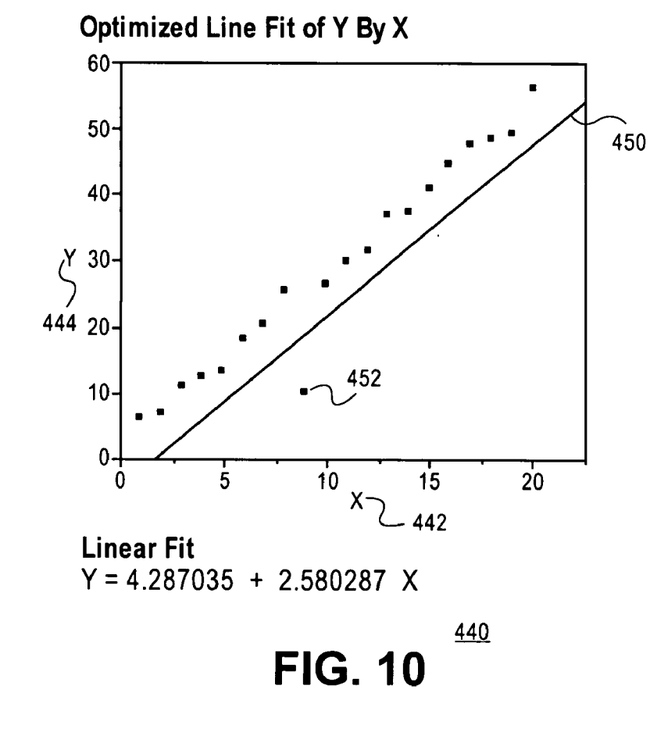
FIG. 10 is a graph illustrating a minimum zone for the array of features, for example, from the graph shown in FIG. 8, in accordance with one embodiment.
Figure 11:
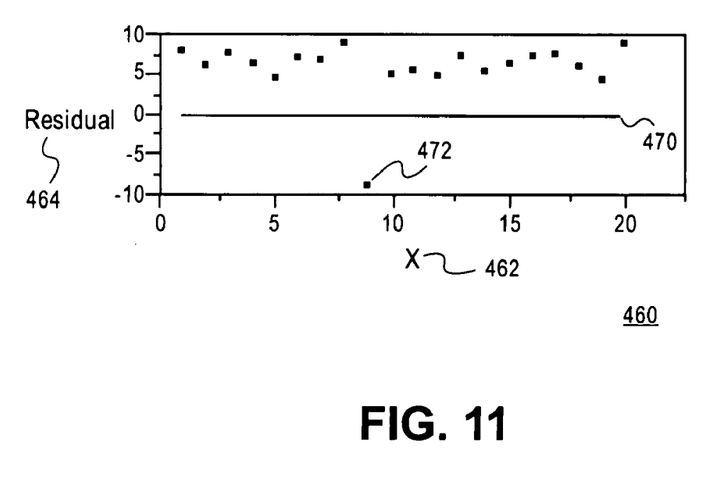
FIG. 11 is a graph illustrating the residuals for the minimum zone graph, as shown in FIG. 10, in accordance with one embodiment.

By more carefully selecting the parameters for the line (the slope and intercept) we can fit a line to the data that meets the desired criteria of ALL points less than 10 mm away from the line. FIG. 10 shows graph 440 with a new line fit 450 which accomplishes this as demonstrated by the residuals 464 in FIG. 11. While this new line 470 is not the "best fit" according to the least squares criteria, it is the "best fit" for this particular application.

In one embodiment, the minimum zone algorithm may be used by providers of inspection hardware and software to obtain better results from measured data ("better" meaning less over-rejection of parts that truly meet the specified criteria for true position of an array of features). For example if Supplier A used this algorithm and Supplier B did not, they could measure the same array of features, and be completely matched in the raw data collected, but Supplier A would report a maximum deviation that was lower than that of Supplier B, sometimes substantially lower, depending on the complexity of the array and the algorithm that Supplier B is using. Supplier A would also return the correct answer.

In the case of pin inspection, on 476 lead packages, this algorithm can reduce the reported maximum true position by over 0.25 mils (0.00025"), against a max spec of 5 mils (0.005"). This can result in a significant reduction in pin rework in the high volume manufacturer (HVM) sites with very substantial return on investment (ROI).

Figure 12:
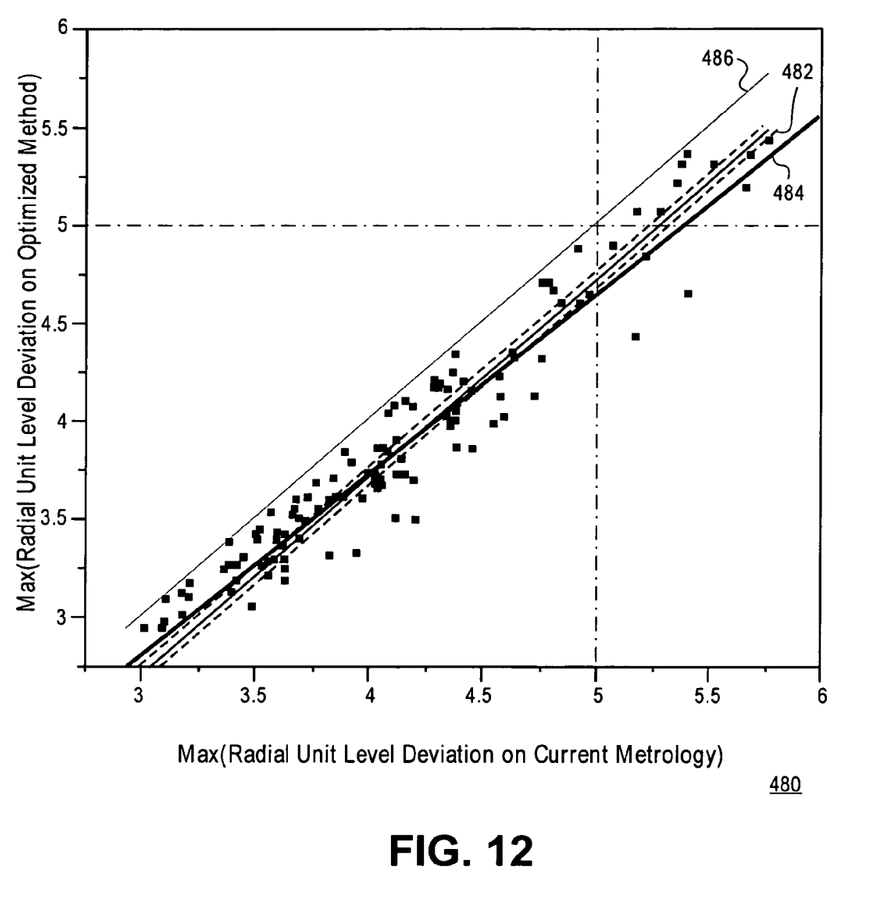
FIG. 12 is a graph illustrating the minimum zone of FIG. 10 versus current meteorology, in accordance with one embodiment.

FIG. 12 is a graph 480, illustrating the minimum zone algorithm compared to current metrology for 119 actual substrates, with a 476 pin grid array. Compared to the current metrology, the minimum zone algorithm being used (see, line 482) provides a reduction of maximum deviation of 0.548 mils (0.274 radial) was seen. The current metrology (see, line 482) is only using a translation adjustment based on the average x and average y offset. A best-fit line 486 (Least Squares) is also fitted to this data with a slope of <1, which indicates that the improvement obtained by using this Minimum Zone algorithm (see, line 484) increases as the worst-case pin gets worse. Using SAS® software to do these calculations, each unit took approximately 250 milliseconds to optimize according to current metrology while the proposed approach (minimum zone algorithm) averaged 7.7 milliseconds.

Elements of embodiments may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments of the invention, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
   defining a target function according to a deviation value of each of at least two features from an array of features based on a rotation parameter, a horizontal translation parameter, and a vertical translation parameter, a feature from the at least two features having a maximum deviation between an actual position and a nominal position;
   minimizing the target function to determine a final rotation parameter, a final horizontal translation parameter and a final vertical translation parameter of the target function that provide a minimum target function value, as a minimum, maximum deviation value for the array of features; and
   generating an inspection report for the array of features, including at least the minimum, maximum deviation value, as well as the final rotation parameter, the final horizontal translation parameter and the final vertical translation parameter of the target function that provide the minimum, maximum deviation value.

2. The method of claim 1, generating the inspection report further comprises:
   comparing the minimum maximum deviation value to a maximum allowed offset for the array of features; and
   generating an entry within the inspection report to indicate at least one of acceptance and rejection for the array of features according to the comparing of the minimum maximum deviation value to the maximum allowed deviation for the array of features.

3. The method of claim 1, wherein defining the target function further comprises:
   defining an x-coordinate nominal position ($N_x$) and a y-coordinate nominal position ($N_y$) for each feature from the array of features to form a nominal position matrix $$\begin{Bmatrix} N_x \\ N_y \end{Bmatrix};$$

measuring an x-coordinate actual position ($A_x$) and a y-coordinate actual position ($A_y$) for each of the features from the array of features to form an actual position matrix $$\begin{Bmatrix} A_x \\ A_y \end{Bmatrix};$$

and
   defining a rotation/translation vector $$\vec{A} = (R)\begin{Bmatrix} A_x \\ A_y \end{Bmatrix} + \begin{Bmatrix} a \\ b \end{Bmatrix}$$

where R is a rotation matrix defined as:

$$R = \begin{pmatrix} \cos\theta & \sin\theta \\ -\sin\theta & \cos\theta \end{pmatrix},$$

θ is a rotation parameter, $$\begin{Bmatrix} a \\ b \end{Bmatrix}$$

is a translation matrix, a is horizontal translation parameter and b is a vertical translation parameter.

4. The method of claim 1, wherein minimizing the target function further comprises:
   selecting a rotation parameter, a horizontal translation parameter and a vertical translation parameter;
   computing a target function value according to the rotation parameter, the horizontal translation parameter and the vertical translation parameter; and
   repeating the selecting and the computing of the target function value until a minimum target function value is detected.

5. The method of claim 4 wherein computing the target function value further comprises:
   multiplying the received rotation parameter by a space shrinkage parameter;
   computing sine and cosine rotation parameters according to the reduced rotation parameter;
   identifying a feature from the array of features having a maximum deviation between a nominal position and an actual position;

finding a feature from the array of features having a maximum deviation between an actual position and a nominal position, which is less than the most deviated array of features;

computing the target function value according to a loss function having a maximum deviated value as an input in combination with the loss function value having the second maximum deviation as an input.

6. The method of claim 4, wherein selecting further comprises:

performing a pattern search subroutine to compute a next rotation parameter, a next horizontal transition parameter and a next vertical translation parameter.

7. The method of claim 6, wherein the pattern search subroutine is a Hooke and Jeeves pattern search subroutine.

8. The method of claim 3, further comprising:

defining a difference vector as:

$$\vec{d} = \left\{ \begin{array}{c} N_x \\ N_y \end{array} \right\} - R \left\{ \begin{array}{c} A_x \\ A_y \end{array} \right\} - \left\{ \begin{array}{c} a \\ b \end{array} \right\};$$

and defining the target functions as:

$$f(a, b, \theta) = \sum_{i \in \Omega(a,b,\theta)} L(d_i(a, b, \theta))$$

Where (a, b, θ) is vector of translation/rotation parameters, di(a, b, θ)(i=1 . . . n) are pin Euclidian distances to the nominal positions, Ω(a, b, θ) is a set of indices of two most deviated pins which depends on (a, b, θ) and L(d) is a loss function with derivative growing on (0,∞).

9. The method of claim 1, wherein a feature from the at least two features having a second most deviated value between an actual position and a nominal position for the features.

10. An article of manufacture having a machine accessible medium having associated data wherein the data, when accessed, results in a machine performing:

defining a target function that describes a maximum deviation for an array of features between an actual position and a nominal position for the array of features, the target function having a rotation parameter, a horizontal translation parameter, and a vertical translation parameter;

determining a final rotation parameter, a final vertical translation parameter and a final horizontal translation parameter that provide a minimum target function value as a minimum, maximum deviation for the array of features;

comparing a minimum, maximum deviation value of at least one feature of the array of features to a corresponding maximum allowed offset of the at least one feature; and generating an inspection report for the array of features including at least one of acceptance and rejection for the at least one feature of the array of features according to the comparing of the minimum, maximum deviation value to the maximum allowed offset of the at least one feature.

11. The article of manufacture of claim 10, wherein defining the target function further results in the machine performing:

defining a target function according to a deviation value of each of at least two features from an array of features based on a rotation parameter, a horizontal translation parameter, and a vertical translation parameter, a feature from the at least two features having a maximum deviation between an actual position and a nominal position.

12. The article of manufacture of claim 11, wherein the machine readable medium further comprises data, which when accessed, results in the machine further performing:

defining an x-coordinate nominal position ($N_x$) and a y-coordinate nominal position ($N_y$) for each feature from the array of features to form an actual position nominal position matrix $$\left\{ \begin{array}{c} N_x \\ N_y \end{array} \right\};$$

measuring an x-coordinate actual position ($A_x$) and a y-coordinate actual position ($A_y$) for each of the features from the array of features to form an actual position matrix $$\left\{ \begin{array}{c} A_x \\ A_y \end{array} \right\};$$

and defining a rotation/translation vector as:

$$\vec{A} = (R) \left\{ \begin{array}{c} A_x \\ A_y \end{array} \right\} + \left\{ \begin{array}{c} a \\ b \end{array} \right\},$$

where R is a rotation matrix defined as:

$$R = \begin{pmatrix} \cos\theta & \sin\theta \\ -\sin\theta & \cos\theta \end{pmatrix},$$

θ is a rotation parameter, $$\left\{ \begin{array}{c} a \\ b \end{array} \right\}$$

is a translation matrix, a is horizontal translation parameter and b is a vertical translation parameter.

13. The article of manufacture of claim 11, wherein the machine readable medium further comprises data, which when accessed, results in the machine further performing:

selecting a rotation parameter, a horizontal translation parameter and a vertical translation parameter;

computing a target function value according to the rotation parameter, the horizontal translation parameter and the vertical translation parameter; and repeating the selecting and the computing of the target function value until a minimum target function value is detected.

14. The article of manufacture of claim 11, wherein the machine readable medium further comprises data, which when accessed, results in the machine further performing:

defining a difference vector $\bar{d}$ as:

$$\bar{d} = \begin{Bmatrix} N_x \\ N_y \end{Bmatrix} - R \begin{Bmatrix} A_x \\ A_y \end{Bmatrix} - \begin{Bmatrix} a \\ b \end{Bmatrix}; \text{ and}$$

defining the target functions as:

$$f(a, b, \theta) = \sum_{i \in \Omega(a,b,\theta)} L(d_i(a, b, \theta))$$

Where $(a, b, \theta)$ is vector of translation/rotation parameters, $d_i(a, b, \theta)(i=1 \ldots n)$ are feature Euclidian distances to the nominal positions, $\Omega(a, b, \theta)$ is a set of indices of two most deviated features which depends on $(a, b, \theta)$ and $L(d)$ is a loss function with derivative growing on $(0, \infty)$.

15. A system comprising:
a coordinate measuring machine (CMM) to capture actual position data including x-coordinates and y-coordinates for an array of features, each feature from the array of features having active position;
a processor coupled to the CMM; and
a machine-readable storage medium in electronic communication with the processor and including CMM software to cause the processor to transform the actual position data captured by the CMM to simulate manual repositioning of the array of features to account for translation and rotation of the array of features to minimize a size of a tolerance zone that contains a maximum deviation for the array of features between an actual position and a true position to provide a minimum, maximum deviation value for the array of features.

16. The system of claim 15, wherein the CMM software further causes the processor to compare the minimum, maximum deviation value for the array of features to a maximum allowed offset for the array of features, and to generate an entry within an inspection report to indicate at least one of acceptance and rejection for the array of features according to the comparison of the minimum, maximum deviation value to the maximum allowed deviation for the array of features.

17. The system of claim 16, wherein the system further comprises:
a user interface coupled to the processor, the user interface to display the inspection report to a user.

18. The system of claim 15, wherein the CMM software further causes the processor to define a target function according to a deviation value of each of at least two features from the array of features for a given set of parameters, a feature from the at least two features having a maximum deviation between an actual position and a nominal position.

19. The system of claim 18, wherein the CMM software further causes the processor to perform a pattern search subroutine to compute a next rotation parameter, a next horizontal translation parameter and a next vertical translation parameter to identify parameters that cause a value of the target function to decrease until a minimum target function value is detected.

* * * * *